No. 668,288. Patented Feb. 19, 1901.
G. P. GASTON.
ACETYLENE GAS GENERATOR.
(Application filed Dec. 13, 1899.)
(No Model.) 2 Sheets—Sheet 1.
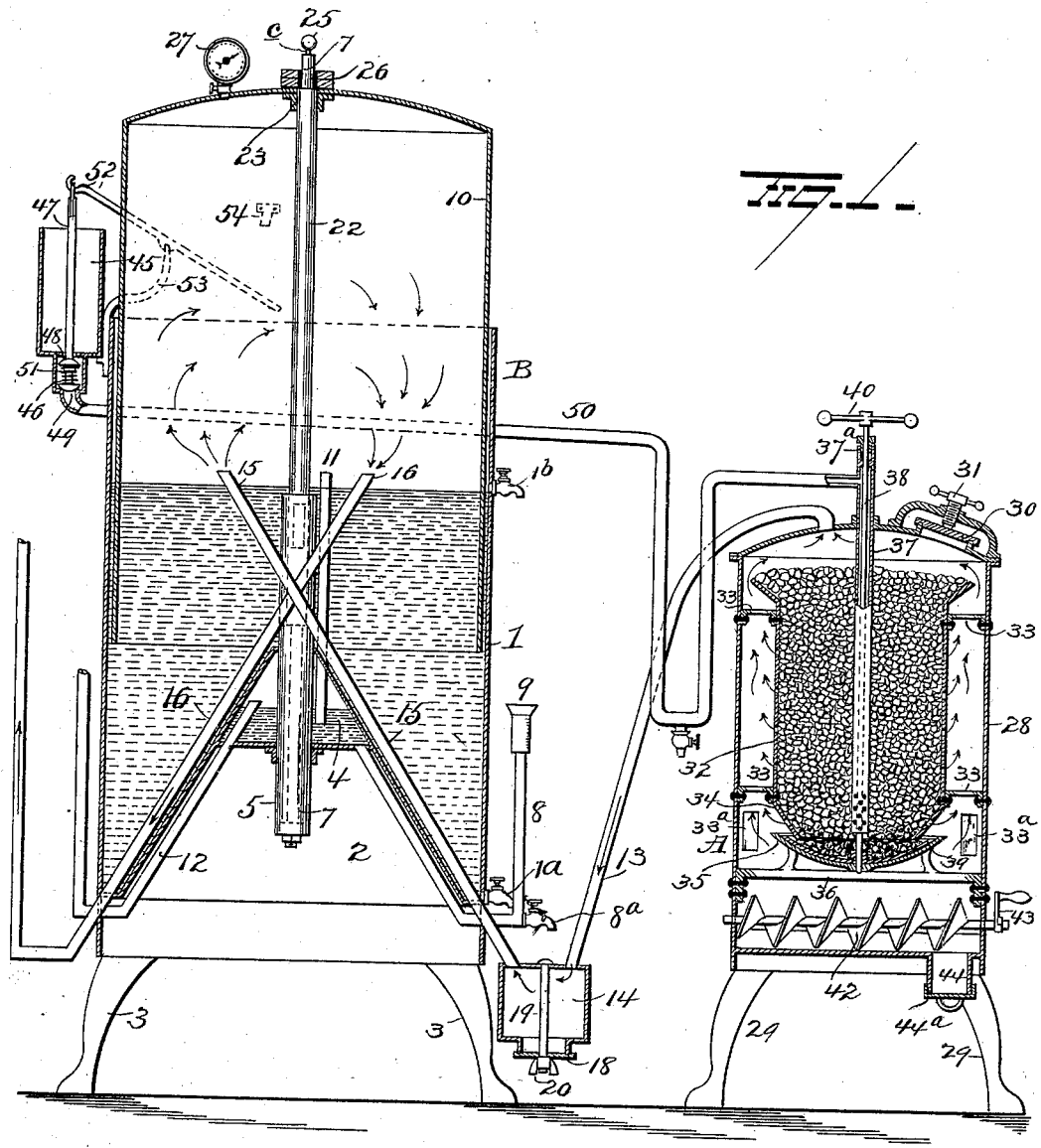

No. 668,288. Patented Feb. 19, 1901.
G. P. GASTON.
ACETYLENE GAS GENERATOR.
(Application filed Dec. 13, 1899.)
(No Model.) 2 Sheets—Sheet 2.
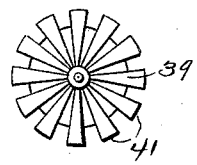
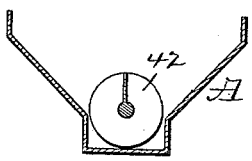
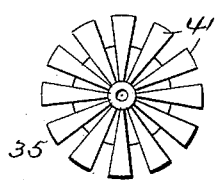
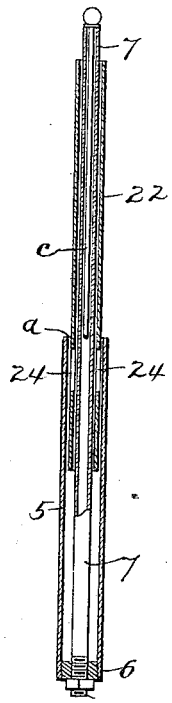
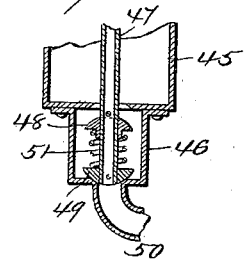
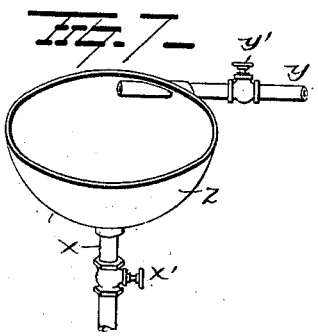
WITNESSES
INVENTOR

UNITED STATES PATENT OFFICE.

GEORGE P. GASTON, OF SILVER CREEK, NEW YORK.

ACETYLENE-GAS GENERATOR.

SPECIFICATION forming part of Letters Patent No. 668,288, dated February 19, 1901.

Application filed December 13, 1899. Serial No. 740,190. (No model.)

*To all whom it may concern:*

Be it known that I, GEORGE P. GASTON, a resident of Silver Creek, in the county of Chautauqua and State of New York, have invented certain new and useful Improvements in Gas Apparatus; and I do hereby declare the following to be a full, clear, and exact description of the invention, such as will enable others skilled in the art to which it appertains to make and use the same.

My invention relates to an improvement in a gas apparatus, the object of the invention being to provide an apparatus of the above-mentioned character which will generate acetylene gas at an economical expenditure of calcium carbid and which will be entirely automatic in its operation and safe from accidental explosion when in use.

With this object in view the invention consists in certain novel features of construction and combinations and arrangements of parts, as will be more fully hereinafter described, and pointed out in the claims.

In the accompanying drawings, Figure 1 is a view in section, illustrating my improvements. Figs. 2, 3, 4, 5, and 6 are detail views, and Fig. 7 is a view of a modified form of my invention.

A represents my improved generator, and B a reservoir connected therewith and adapted to receive gas therefrom.

The reservoir B comprises a tank 1, having an upwardly-extending conical bottom 2 and suitable legs or supports 3, as shown. The conical bottom 2 is provided on its upper end with a conical receptacle 4, entirely closed. A vertical tube or pipe 5 passes entirely through said receptacle 4 and projects upward any desired distance, where it is open, as shown at $a$, and projects down below the receptacle 4, where it is closed by a suitable plug 6. A water-supply pipe 8 extends from a point about midway the outside of the tank 1 downward to the base of the conical bottom and then through the tank and up into the receptacle 4 and terminates flush with the bottom of said receptacle. The outer end of the supply-pipe 8 is provided with a telescoping gage 9, which will at all times denote the water-level in the receptacle and at the same time act as an auxiliary or telescoping section of said supply-pipe should a greater amount of water be desired in the receptacle 4. A suitable exhaust-valve $8^a$ is provided at the lowest portion of the pipe 8 to exhaust the water from the receptacle 4 and pipe 8.

Water is placed in the tank 1, and a bell or float 10 is placed therein, leaving a space between the top of the bell and the water-level for the reception of gas. A valve $1^a$ is provided at the bottom of the tank 1 for exhausting the water therefrom, and a valve $1^b$ is provided in said tank for regulating the water-level therein. An exhaust-pipe 11 communicates with the bell 10 above the water-line therein and projects downward into the receptacle 4, terminating below the water-line therein, whereby to permit the escape of gas from the bell should same become excessive, and the water in the receptacle 4 will act as a seal and give sufficient resistance to the gas to prevent its constant flow therein. The resistance of the flow of gas can be regulated by increasing or diminishing the amount of water in the receptacle, as it will be seen that the greater the body of water the gas is compelled to penetrate the greater the resistance to the passage of the gas. A pipe 12 communicates with the interior of the receptacle 4 at a point above the water-line thereof and is adapted to convey the exhausted gas to a point outside of the building or to an auxiliary reservoir, as may be desired.

Gas is conveyed to the reservoir by a pipe 13, which communicates with the top of my improved generator A, which will be more fully hereinafter described. The pipe 13 projects downward into a sediment or condensing chamber 14. A pipe 15 projects upward from said sediment-chamber 14 and communicates with the interior of the bell at a point above the water-line. A pipe 16 communicates with the interior of the bell and extends downward and outward and is adapted to convey the gas from the reservoir to any desired point for burning.

The sediment and condensing chamber 14 above referred to is preferably provided with transparent sections to enable the operator to see at all times the amount of sediment therein and effect its removal before accident can occur, as is the case so frequently with the devices now in use. A suitable door or shutter 18 may be provided for cleaning said sediment-chamber, and said door or shutter is adapted to be closed and held in place by a suitable bolt 19 and thumb-nut 20, as shown in Fig. 1.

The tube 5 heretofore mentioned is disposed slightly below the water-level in the tank, and hence is constantly filled with water.

An opening is provided centrally in the top of the bell 10, and a tube or pipe 22 is connected to the under face of said bell and communicates with said opening therein and is secured in place by a suitable ring 23. The tube or pipe 22 projects downward into the tube 5 a suitable distance below the water and is provided near its lower end with slots or openings 24, whereby when the bell becomes so full of gas that it will rise to a sufficient height to permit the slots or openings 24 in the tube 22 to pass above the water-line the gas will pass into said pipe and escape through the top of the bell. A tube 7 is secured to the plug 6 in the bottom of tube 5 and projects upward through the pipe or tube 22 and through the top of the bell any desired height, and a rod $c$ is disposed in said tube 7 and provided on its upper end with a weighted enlargement 25 to act as an extra weight automatically applied to the gas-holder or bell as the same rises and acts in the same capacity as a counterbalance on the safety-valves of a steam-boiler when the gas-holder or bell rises above the water in the tank, thus allowing the gas to escape into tube 22. This extra weight or rod $c$ holds the gas-holder steady and at the same time allows the gas to escape until the counterweight overpowers the pressure of gas, so that the slots again fall below the water-level in the tank, and is only used as an extra precaution in case of an overpressure of gas to prevent explosion. Ordinarily the overpressure should escape through the receptacle 4. Suitable weights 26 are disposed around said tube 7 on top of the bell, whereby to counterbalance the upward tendency of the bell and regulate the necessary gas-pressure. A gage 27 may also be provided on said bell to indicate the precise pressure of gas in the reservoir.

The generator A comprises a casing 28, supported on legs 29 and provided in its top with a manhole 30 for the entrance of the carbid and adapted to be closed by a suitable clamp 31. A cylindrical perforated carbid-holder 32, made, preferably, flaring at its upper end, is mounted centrally in the casing 28 and is spaced therefrom and supported by brackets 33. The carbid-holder 32 is contracted at its lower end, as shown at 34, and a grate 35, larger in diameter than the open end of the holder 32, is disposed below the holder and secured to a cross-bar or cross-bars 36, secured to the casing. A pipe 37 for supplying water to the generator passes down through the top of the casing, down through the center of the carbid-holder, and terminates near the bottom thereof, where it is provided with suitable perforations. A shaft 38 is disposed in this pipe 37, is mounted centrally in the stationary grate 35, and has its bearing in the cross-bar 36. A grate 39 is mounted between the lower end of the carbid-holder 32 and the stationary grate 35 and is secured to the shaft 38, and said shaft projects beyond the upper end of the pipe 37 and is provided on its upper end with a suitable handhold 40 for turning the grate 39 when it is desired to agitate the carbid. A suitable packing $37^a$ is provided in the upper end of the pipe 37 around the shaft 38 to prevent any escape of gas. The grates 35 and 39 consist of a series of radiating wedge-shaped slats 41, converging at their center, so that when the grate 39 is moved to a position to bring its slats between the slats of the grate 35 the bottom of the carbid-holder will be closed and the escape of carbid and water prevented. At $33^a$ are placed transparent openings made gas-tight to view the operation of water on the carbid at or near the bottom of the casing 28, and below the bottom is preferably contracted and is provided with a worm conveyer 42, operated by a crank 43 outside the casing, to convey the ashes or residue of the carbid to a discharge-spout 44, normally closed by a cap $44^a$.

Secured to the outside of the tank 1, at a point preferably near its top, is a small tank 45, to which is connected any suitable water-supply. (Not shown.) The tank 45 is provided at its lower end with a chamber 46, of transparent material, communicating with the tank 45, and a vertical hollow rod 47 is disposed in said tank and chamber and is provided in said chamber with oppositely-disposed valves or stoppers 48 and 49. 48 is provided with a sleeve and slides on rod 47, while 49 is attached to the lower end of rod 47 and is stationary. The valve 48 is adapted to close the opening between the tank and chamber when the hollow rod is raised, and the valve 49 is adapted to close the outlet of said chamber and prevent the passage of water to the generator A through the pipe 50, which communicates with the pipe 37 near its upper end, as clearly shown. A coiled spring 51 is disposed between the valves 48 and 49 to normally hold them in proper position and also to permit the valve 49 to be drawn away from and fully uncover its seat when the rod 47 is raised. The rod 47 is made hollow to permit an escape of air from the chamber 46. Otherwise the suction resulting from the raising of the valve 49 would form a vacuum and stop the flow of water from said chamber 46. A lever 52 is connected at one end to the upper end of the rod 47, is fulcrumed between its ends on a bracket 53, secured to the tank 1, and its free end is adapted to be engaged by a lug 54 on the bell when the latter falls to a predetermined position, thus permitting the water to flow to the generator, generate gas, and raise the bell out of engagement with the lever 52. It will be seen that with my improved generator the water is supplied to the carbid at the bottom of the pile and centrally thereof, thus insuring the contact of the water and carbid and at the same time only using a small amount of carbid at each entrance of water, hence resulting in a most economical and at the same time effective generator.

Instead of providing the generator with a worm conveyer for discharging the ashes I may employ the construction shown in Fig. 7. In this form of my invention I place beneath the stationary grate a conical bowl $z$, converging into a pipe $x$, communicating with a sewer and provided with a suitable valve $x'$. A pipe $y$, having a suitable valve $y'$ therein, connects the conical bowl with any approved water-supply, and the end of the pipe $y$ is made of suitable shape to give to the inflowing water a circular or whirling motion to wash the conical bowl and carry off the ashes and sediment.

Various slight changes might be resorted to in the general form and arrangement of the several parts described without departing from the spirit and scope of my invention, and hence I would have it understood that I do not wish to limit myself to the precise details set forth, but consider myself at liberty to make such slight changes and alterations as fairly fall within the spirit and scope of my invention.

Having fully described my invention, what I claim as new, and desire to secure by Letters Patent, is—

1. In a generator, the combination with a casing, of a carbid-holder disposed within the casing and spaced therefrom, said holder open at both ends and having its upright wall perforated to permit the escape of gas into the space surrounding the holder, a grate below the holder and a pipe for water terminating within the lower portion of the holder.

2. In a generator, the combination with a casing, of a carbid-holder in said casing and spaced therefrom, a stationary grate below the open bottom of the carbid-holder, a movable grate disposed between the stationary grate and the bottom of the carbid-holder, a pipe extending down through the carbid-holder and terminating near the lower end thereof for moving said grate, means for supplying water to the base of the carbid in the bottom of the holder and means for conveying gas from said casing.

3. In a generator, the combination with a casing, of a carbid-holder mounted in said casing and spaced therefrom, a stationary grate below the open bottom of the carbid-holder, a movable grate disposed between the stationary grate and the bottom of the carbid-holder, means for moving said movable grate, means for supplying water to the base of said carbid-holder, and means for conveying the gas from said casing, also means provided by transparent openings in the outer case, made gas-tight for viewing the operation.

4. In a generator, the combination with a casing, of a carbid-holder mounted in said casing and spaced therefrom, a vertical water-supply pipe disposed centrally in said carbid-holder and adapted to discharge at the base of said holder, a shaft disposed in said pipe, a grate secured to said shaft and disposed beneath the open end of the carbid-holder, and means for turning said shaft.

5. In a generator, the combination with a casing, of a perforated carbid-holder mounted in said casing and spaced therefrom, a stationary grate below the open lower end of said holder, a movable grate on top of said stationary grate, said grates so constructed that when turned to one position will close the bottom of said holder and when turned to another position will permit the ashes to fall therethrough, and means for turning said movable grate.

6. In a gas apparatus, the combination with a generator and reservoir therefor, of a water-supply tank secured to said reservoir, a chamber of transparent material beneath said tank and communicating therewith, a pipe connecting said chamber and generator, a vertical hollow rod disposed in said tank and chamber, valves or stoppers in said chamber for closing the passage between the tank and chamber and for closing the passage from the chamber into the pipe, a spring adapted to normally hold said valves in proper position and automatic means for operating said stoppers or valves.

7. In a gas apparatus, the combination with a generator and a reservoir therefor, of a carbid-holder in said generator, a movable grate at the base of said carbid-holder, a pipe for supplying water to the central portion of the carbid-holder near the grate and means connected with the reservoir for automatically regulating the passage of water to the generator.

In testimony whereof I have signed this specification in the presence of two subscribing witnesses.

GEORGE P. GASTON.

Witnesses:
C. G. TALCOTT,
CHAS. STACY.